United States Patent [19]

Witchell

[11] Patent Number: 4,498,915
[45] Date of Patent: Feb. 12, 1985

[54] AIR FILTERS

[76] Inventor: Stanley P. Witchell, 17 Town Close, Vicarage Hill, Dartmouth, South Devon, England

[21] Appl. No.: 129,786

[22] Filed: Mar. 12, 1980

Related U.S. Application Data

[63] Continuation-in-part of Ser. No. 558,496, Mar. 14, 1975, Pat. No. 4,200,444.

[30] Foreign Application Priority Data

Feb. 23, 1980 [GB] United Kingdom ............... 8006177

[51] Int. Cl.³ ............................................. B01D 46/10
[52] U.S. Cl. ........................................ 55/498; 55/521
[58] Field of Search ................. 55/497, 498, 502, 521; 210/493

[56] References Cited

U.S. PATENT DOCUMENTS 4,200,444 4/1980 Witchell ............................... 55/500

FOREIGN PATENT DOCUMENTS 1507824 4/1978 United Kingdom ................. 55/500

OTHER PUBLICATIONS

Donaldson Konepac Air Cleaner, Donaldson Co., Inc., Minneapolis, Minn., pp. 1–4, Dated 11/15/77.

Primary Examiner—Bernard Nozick
Attorney, Agent, or Firm—William A. Drucker

[57] ABSTRACT

A generally tubular pleated paper filter element is constructed in the form of a frustrum of a cone having an aspect ratio (the ratio of element length to base diameter) in the range 1.5 to 2.5 and an included angle in the range 2 to 5 degrees.

3 Claims, 1 Drawing Figure

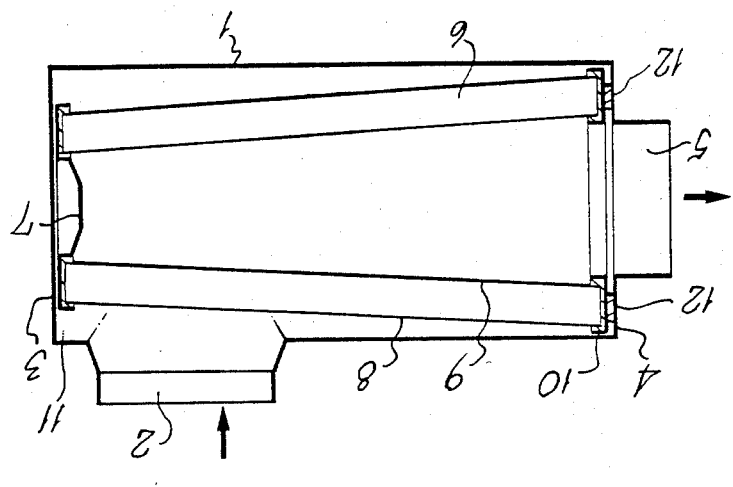

AIR FILTERS

This application is a continuation-in-part of my copending application Ser. No. 558496 filed on Mar. 14, 1975 now U.S. Pat. No. 4,200,444 issued Apr. 29, 1980.

This invention relates to air cleaners of the kind comprising a casing having an inlet and an outlet and a pleated paper filter element mounted inside the casing so that in use, air flows from the inlet to the outlet through the element. More specifically, it is concerned with air filters in which the filter element is generally tubular in the form of a frustrum of a cone whose open ends are arranged to abut against opposite ends of the casing in sealing relation therewith so that air flowing from inlet to outlet is constrained to pass through the tubular wall of the element.

The filter element itself is usually replaceable, the casing being divisible to permit this replacement which is effected either at regular intervals, or simply whenever the element becomes choked by whatever contaminant is being filtered out of the air. In order to maximise the time between such successive replacements it is very desirable that the wall of the element should present the greatest possible utilisable surface area for receiving the contaminant without unduly obstructing either the inlet or outlet and that the flow of contaminated air should be evenly distributed over this surface area. The first of these requirements may be met in part by making the outside of the element the inlet side for the contaminated air, but for a given casing size, the second requirement restricts the maximum possible diameter of the element. Unfortunately, the size of the casing is also very often restricted by the space available to house it, a factor which is often outside the control of the filter manufacturer, particular in the automotive industry.

Increasing the filter element thickness radially inwardly can yield a valuable increase in the surface area, but in the context of a restricted size of casing it may also result in the outlet being at least in part obstructed, as well as in an excessive pressure drop appearing across the element.

Where the filter element is made of pleated paper further complications arise. The peaks and troughs of the pleats usually extend axially of the element and the depth of the pleats determines the radial thickness of the element. Clearly, the spacing of the pleats and their depth greatly affects the total utilisable surface area of paper in the filter, but a much more important practical consideration is the ease with which contaminating particles can penetrate into the pleats. Too close a spacing and/or too deep a pleat results in a large surface area but one which is poorly utilized because the walls defining the pleats, especially their radially innermost regions, are too close together.

British Pat. No. 1507824 describes and claims an air filter comprising a casing having first and second openings defined in its wall, a generally tubular pleated paper filter element of non-uniform diameter having at least one region of relatively small diameter and axially spaced therefrom at least one region of relatively wide diameter and whose open ends are arranged to abut against opposite ends of the casing in sealing relation therewith, said element being mounted in the casing so that, in use, air flowing from the first opening to the second opening is constrained to flow through the wall of the element, the first opening communicating with the outside of the element in the vicinity of the relatively small diameter region thereof and the second opening communicating with the inside of the element at the relatively wide diameter region thereof, said second opening having a diameter substantially equal to the internal diameter of the element in said wide diameter region, the external diameter of the element in said wide diameter region being substantially equal to the internal diameter of the casing, so that the second opening has the maximum possible diameter for a given size of casing and element wall thickness.

The arrangement just recited is a significant step forward because it provides a way of improving air filter (or air cleaner) performance, whilst still using paper pleated to the more or less standard pleat depths commonly used in the industry for very heavy duty truck/commercial vehicle applications.

Whilst the basic concepts defined in the aforesaid patent still hold good it has now been discovered that certain parameters of filter element shape and configuration are very important in achieving optimum performance. For example, one commercially-available filter element constructed in accordance with the principles set out in the above patent has the following dimensions, (a) overall length 50 cm; (b) large end diameter 17 cm; (c) small end diameter 10 cm; (d) pleat depth 3 cm; (e) number of pleats 135. The combination of (a), (b) and (c) resulted in an included angle of just over 6 degrees for the conic section defined by axial projection of the walls of the element. The outlet diameter of the element (at the base of the cone) was 10 cm; the pleat depth being 28% of the outlet diameter. On performance testing in a conventional casing 18 cm in diameter at an outside-to-inside airflow of 11 cu. meters/minute this element exhibited an initial pressure drop of 7.5 cm of water. After testing for 1½ hours, during which standard dust was continuously fed into the inlet airstream, the pressure drop rose to 51 cm of water, at which point the test was stopped and the amount of dust caught by the element was checked by weighing. At the same time, the distribution of the dust both over the depth of the pleats and over their length, was assessed visually. The total weight of the dust was 870 gm, but its distribution was very uneven, substantial areas of the filter paper being virtually free from dust, particularly towards the relatively small diameter end of the element and despite the relatively shallow pleat depth. All the indications were that this element, although an improvement on an equivalent conventional, parallel-sided element (in a larger diameter casing), was still fairly inefficient in terms of both dust holding capacity and service life.

According to the present invention a generally tubular pleated paper filter element is constructed in the form of a frustum of a cone having an aspect ratio (as hereinafter defined) in the range 1.5 to 2.5, and an included angle in the range 2 to 5 degrees.

Aspect ratio is defined as the ratio of element length to diameter, the latter being the diameter of the relatively wide end (the base) of the cone; an aspect ratio of 2 is particularly preferred in this present context. The importance of the aspect ratio and the included angle of the cone is a direct consequence of the fact that the number of pleats in the paper is a fixed quantity; it does not vary lengthwise of the element.

Furthermore, for a given size of filter/element, the total area of paper is itself limited by the need to ensure that even after pleating and forming into a tubular element, as much as possible of the total area remains available, i.e. accessible to dust. In real terms, this requirement of dust accessibility limits both the depth of the pleats and their spacing. If the pleats are too deep, the radially-innermost portions of adjacent pleat walls will touch one another, thereby preventing dust from gaining access to these portions. If there are too many pleats, they will simply be too close together thereby exacerbating the problem just mentioned, even if the pleats are made to have a less-than-optimum depth. All of the foregoing applies equally to conventional cylindrical pleated paper filter elements, but where the element is a frustum of a cone, at least one further difficulty arises. That is that even if the number of pleats is such as to give optimum pleat spacing at one end of the element, it will not give optimum spacing at the other end, almost regardless of the depth of the pleats. If the spacing is correct at, say, the large diameter end of the cone, the spacing at the small diameter end can be such as to give at least some bunches of pleats which are virtually totally inaccessible to dust. This was one of the problems with the commercially-produced element referred to earlier. Pleat bunching rendered a substantial area of paper almost useless this useless or ineffective area was estimated to be about 20 to 25% of total paper area. Reducing the number of pleats was not the answer, because this would inevitably have reduced the total paper area.

Likewise simply reducing the pleat depth would also have reduced the total paper area, without affecting the bunching problem at all. In fact, pleat depth for most of the practical air cleaner elements useful for truck or commercial vehicle engines is generally in the range 2.5 cm to 5 cm. Pleat depths in the range of from 35 to 45% of the element outlet diameter are preferred for maximum dust holding purposes. This applies to engines of cubic capacity 4 liters and over and is associated with filter throughputs of the order of 4 to 40 cubic meters/minute. It will be appreciated that it is to this class of service that the present invention is primarily directed, where the problems of achieving satisfactory performance are onerous, particularly in view of the fact that commercial vehicle engines very rarely operate in ideal conditions, being exposed to climatic and other environmental changes over relatively lengthy periods between routine servicing/maintenance.

By selecting the parameters of aspect ratio and included angle according to the invention, significant performance improvements can be achieved for a given size of filter casing and for a given filter paper pleated to a pleat depth in the range given earlier. The effect of the included angle is especially important in minimizing pleat bunching and at the preferred aspect ratio of 2, an included angle of 3 to 4 degrees is satisfactory. An included angle of 4 degrees is normally the most satisfactory angle to adopt because at anything below 3 degrees it has been found that there is little or no improvement in dust holding whilst the proximity of the element to the inlet to the filter casing becomes such as to tend to create excessive inlet flow restriction. At the high volume throughputs which are of interest, this latter kind of effect is unacceptable where the airflow requirements of the associated engine are substantial. In any case, as the dust builds up on the element, the overall restriction (pressure drop across the filter/filter element) will also increase. Clearly it is wholly inappropriate to have an excessive initial restriction. It will be appreciated that the openings in the casing should both have as large a diameter as possible, up to at least the full internal diameter of the element.

The invention also includes an air cleaner incorporating a pleated paper filter element according to the present invention.

In order that the invention be better understood, a preferred embodiment of it will now be described by way of example with reference to the accompanying drawing in which the sole FIGURE is a diagrammatic cross-sectional side view of an air cleaner incorporating a filter element constructed in accordance with the invention.

The air cleaner comprises a tubular, cylindrical casing 1 having a generally radially directed inlet 2 towards one end thereof. An end cover 3 adjacent said one end is made demountable for purposes of access, but this feature is so well-known as to merit no further discussion here. The opposite end has a cover 4 integral with the casing; it also has an axial outlet opening 5. Inside the casing, there is a pleated paper filter element 6 constructed in the form of a frustum of a cone. The base of the cone surrounds the outlet 5; the diameter of the latter is the same as the inside diameter of the adjacent portion of the element. The inside diameter of the casing 1 is almost the same as the outside diameter of the base of the cone. The element was made by pleating a sheet of filter paper and folding the pleated product around the axis of the pleats to make a conical tube open at both ends and with the pleats extending axially of the tube. After securing in the desired conical configuration and mouting between concentric perforated metal supporting tubes 8 and 9, the pleats and supporting tubes 8 and 9 at the opposite ends of the element were adhesively bonded into metal end caps 10 and 11 respectively. The end cap 10 is provided with an annular elastomeric seal 12, to prevent air from by-passing the filter element 6 when clamped inside the casing 1 between the end covers 3 and 4. The other end cap 11 has an integral blanking plate 7 which serves to close the opposite end of the filter element, thereby avoiding the need for another gasket 12. The element pleats had a depth of 3.8 cm. Its aspect ratio was very slightly over 2 and the included angle of the cone was 4 degrees. The outlet diameter was 10 cm. The element was 18 cm in diameter at the base of the cone and 15.5 cm. in diameter at the apex; it was 38 cm long and it was tested under the same conditions as the commercially-available filter element previously described. It had an initial restriction (pressure drop) of 12 cm of water, but on testing as before until exactly the same pressure drop was achieved, the element proved to have absorbed some 900 gm of standard dust. The test took 1½ hours to reach this point and it was obvious that a significant performance improvement had resulted from the subtle changes in element geometry because this element had only 75% of the area of filter paper of the commercially available element; its casing occupied only 80% of the volume of the casing of the latter. It is to be noted that the initial restriction was higher than that of the commercially-available element, but this is not normally a critical factor; the service life to an unacceptable level of restriction is much more important.

A significant reduction in casing was achieved for the same performance.

What we claim is:

1. An air cleaner incorporating a generally tubular pleated paper filter element constructed in the form of a frustum of a cone with the pleats extending axially thereof, and the cone having an aspect ratio of 2 and an included angle of 4 degrees, said cleaner comprising a tubular casing having an opening in the tubular side wall towards one end thereof in communication with the relatively small diameter region of the element and an axial opening diameter substantially equal to the internal diameter of the relatively wide diameter end of the filter element, the casing having substantially the same internal diameter as the outside diameter of said wide diameter end of the filter element wherein the pleat depth is in the range of from 35 to 45% of the element outlet diameter.

2. The cleaner of claim 1 wherein said pleats have a depth in a radial direction in the range of 2.5 cm to 5 cm.

3. A filter element according to claim 1 or 2 having a throughput in the range 4 to 40 cubic meters/minute.

* * * * *